United States Patent [19]

Habicht

[11] Patent Number: 5,205,699
[45] Date of Patent: Apr. 27, 1993

[54] METHOD AND APPARATUS FOR LIFTING AND TILTING DRUMS OF FLOWABLE MATERIAL

[76] Inventor: Helmut Habicht, 15 Royal Park Ter., Hillsdale, N.J. 07642

[21] Appl. No.: 860,891

[22] Filed: Mar. 31, 1992

[51] Int. Cl.$^5$ .............................................. B65G 65/23
[52] U.S. Cl. .................................... 414/420; 414/421; 414/422; 414/786; 414/592; 187/9 E
[58] Field of Search ............... 414/403, 404, 408, 409, 414/728, 419, 420, 421, 422, 743, 742, 192, 592, 618, 786; 187/9 R, 9 E

[56] References Cited

U.S. PATENT DOCUMENTS

| | | | |
|---|---|---|---|
| 2,507,583 | 5/1950 | Wellman | 414/420 |
| 3,191,788 | 6/1965 | Hopfeld | 414/420 |
| 3,306,479 | 2/1967 | Hopfeld | 414/421 X |
| 3,522,893 | 8/1970 | Yokich | 414/420 |
| 4,797,050 | 1/1989 | Habicht | 414/420 |
| 4,954,037 | 9/1990 | Habicht | 414/422 X |

FOREIGN PATENT DOCUMENTS 845512  6/1970  Canada .................... 414/420

Primary Examiner—Frank E. Werner
Attorney, Agent, or Firm—Patrick J. Pinto

[57] ABSTRACT

A drum, container and the like of a flowable material is placed and retained on a container support assembly of a lifting and tilting apparatus. This lifting and tilting apparatus includes a telescoping column attached to a base support. Interior of the column is a hydraulic cylinder for lifting the sliding portion of the tubular column. As the sliding portion is lifted the container support is lifted at twice the lift rate of the column. The container support is independently tilted at any convenient height between the lifting extent of the apparatus. The tilting of the container support is provided by an air operated gear-motor carried on a moveable carriage. The moveable carriage and gear-motor are fully contained interior of the telescoping column. A slot is provided in the telescoping column to allow the independent lifting and tilting of the container support by an operator.

19 Claims, 4 Drawing Sheets

METHOD AND APPARATUS FOR LIFTING AND TILTING DRUMS OF FLOWABLE MATERIAL

BACKGROUND OF THE INVENTION

1. Field of the Invention

With regard to the classification of art, this invention is believed to be found in the general class entitled "Material or Article Handling", and more particularly to the subclasses pertaining to rotating cradles which have a non-fixed pivot. This apparatus is of an elevator type having a telescoping tubular column.

2. Description of the Prior Art

The lifting and tilting of receptacles such as drums and the like are the subject of several prior U.S. Patents. The closest known art related to the present invention are U.S. Pat. No. 4,797,050, issued to Habicht on Jan. 10, 1989 and U.S. Pat. No. 4,954,037, issued to Habicht on Sept. 4, 1990. Each of the listed patents has issued to the present inventor, who also is the sole owner. U.S. Pat. Nos. 4,797,050 and 4,954,037 are incorporated by reference into the present invention to the extent the present law allows.

Each of my prior U.S. Patents teaches the use of a camming trackway to provide the tilting action. It has been found that a camming trackway provides very accurate and repetitive tilting motion as and when the drum is lifted. This is of importance when the apparatus is used with a receiving apparatus which have like or uniform receiving heights.

It has been determined that a need exists for a lifting and tilting apparatus which is capable of being tilted independently of the lift, so as to discharge the material carried in the drums. This need has been identified as the lifting and tilting apparatus has found new uses with equipment having non-uniform receiving heights for their apertures, mouths, openings and the like which accept the material discharged from the receptacle.

The present invention solves the need to provide an apparatus which is capable of being used with a variety of processing equipment.

SUMMARY OF THE INVENTION

It is an object of this invention to provide and it does provide an apparatus for lifting and tilting of drums of flowable material in which the drums may be fully tilted independently of the height of the lift.

It is also an object of this invention to provide and it does provide a lifting and tilting apparatus which is mobile.

It is another object of this invention to provide and it does provide a lifting and tilting apparatus which is compact in size for transporting receptacles through a standard doorway or opening in walls.

In addition to the above summary, the following disclosure is detailed to insure adequacy and aid in the understanding of this invention. This disclosure, however, is not intended to cover each new and inventive concept, no matter how it may be disguised either by variations in form or additions by further improvements. For this reason, there has been chosen specific embodiments of an apparatus for lifting and tilting a receptacle. This apparatus is adapted for use in industries requiring the discharge of materials from drums for further processing. These specific embodiments have been chosen for the purpose of illustration and description as shown in the accompanying drawings wherein:

BRIEF DESCRIPTION OF THE DRAWING

In the following description and in the claims, various details are identified by specific names for convenience. These names are intended to be generic in their application. Corresponding reference characters refer to like members throughout the several figures of the drawings.

The drawings accompanying, and forming a part of this specification disclose details of construction for the sole purpose of explanation. It is understood that structural details may be modified without departing from the concept and principles of the invention. This invention may be incorporated in other structural forms than shown.

DESCRIPTION OF A FIRST EMBODIMENT

Figure 1:
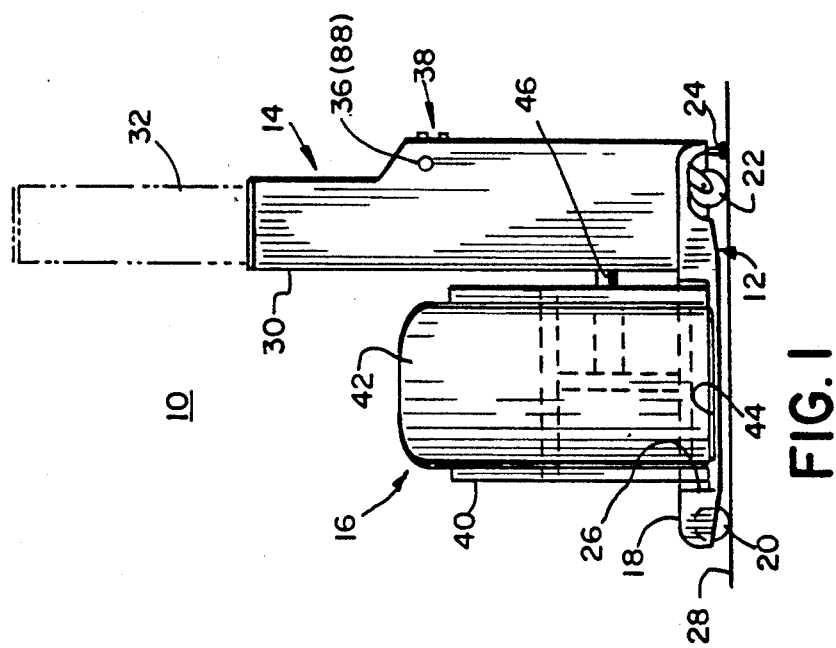
FIG. 1 represents a front elevational view, partly diagrammatic, of one embodiment of an apparatus of the present invention.

Referring to FIG. 1, a lifting and tilting apparatus of the present invention is generally identified as 10. This apparatus 10 has a base support assembly 12, a column assembly 14, and a container support assembly 16.

The base assembly 12 includes a shaped base support 18, wheels 20, casters 22, and stabilizing locks 24. The base support member 18 has a recessed portion 26 to allow the container support assembly 16 to be lowered as close to the floor line 28 as possible. This lowered position of the container support allows a receptacle to be placed onto the container support assembly 16 and retained thereon by a retaining means such as a clamp (not shown).

Figure 2:
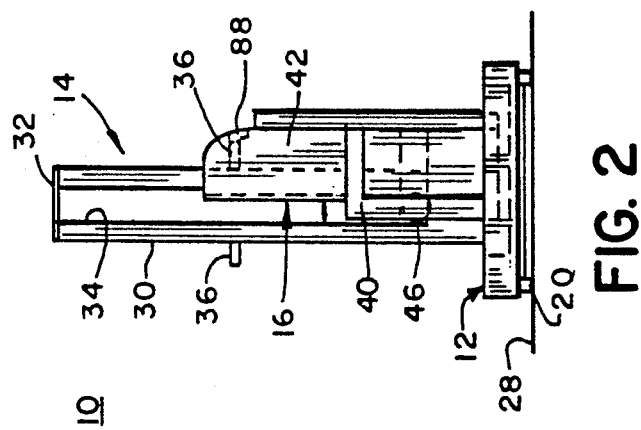
FIG. 2 represents a side elevational view of the apparatus in FIG. 1.
Figure 3:
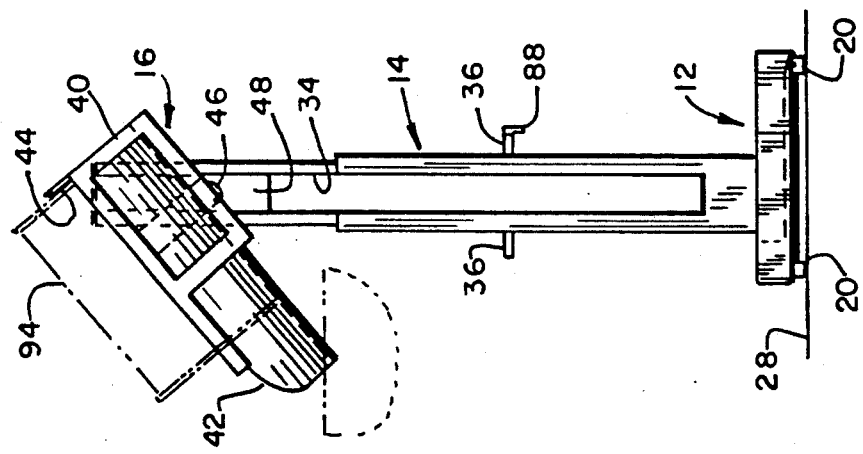
FIG. 3 represents a side elevational view of the apparatus of FIG. 1, this view particularly showing the column of the apparatus in an extended condition with a drum being tilted to a discharge condition.

Referring now to FIG. 2 and 3, the column assembly 14 includes a first tubular column 30, a second tubular column 32, a slot 34 formed in each of the first column 30 and second column 32, a pair of extending handles 36, and lifting and tilting controls 38, more clearly seen in FIG. 1.

Referring again to FIG. 1 and 2, the container support assembly 16 includes a frame 40, an elongated cradle 42, and a shelf portion 44, more clearly seen in FIG. 3. This container support assembly 16 is fastened to a shaft member 6.

Figure 4:
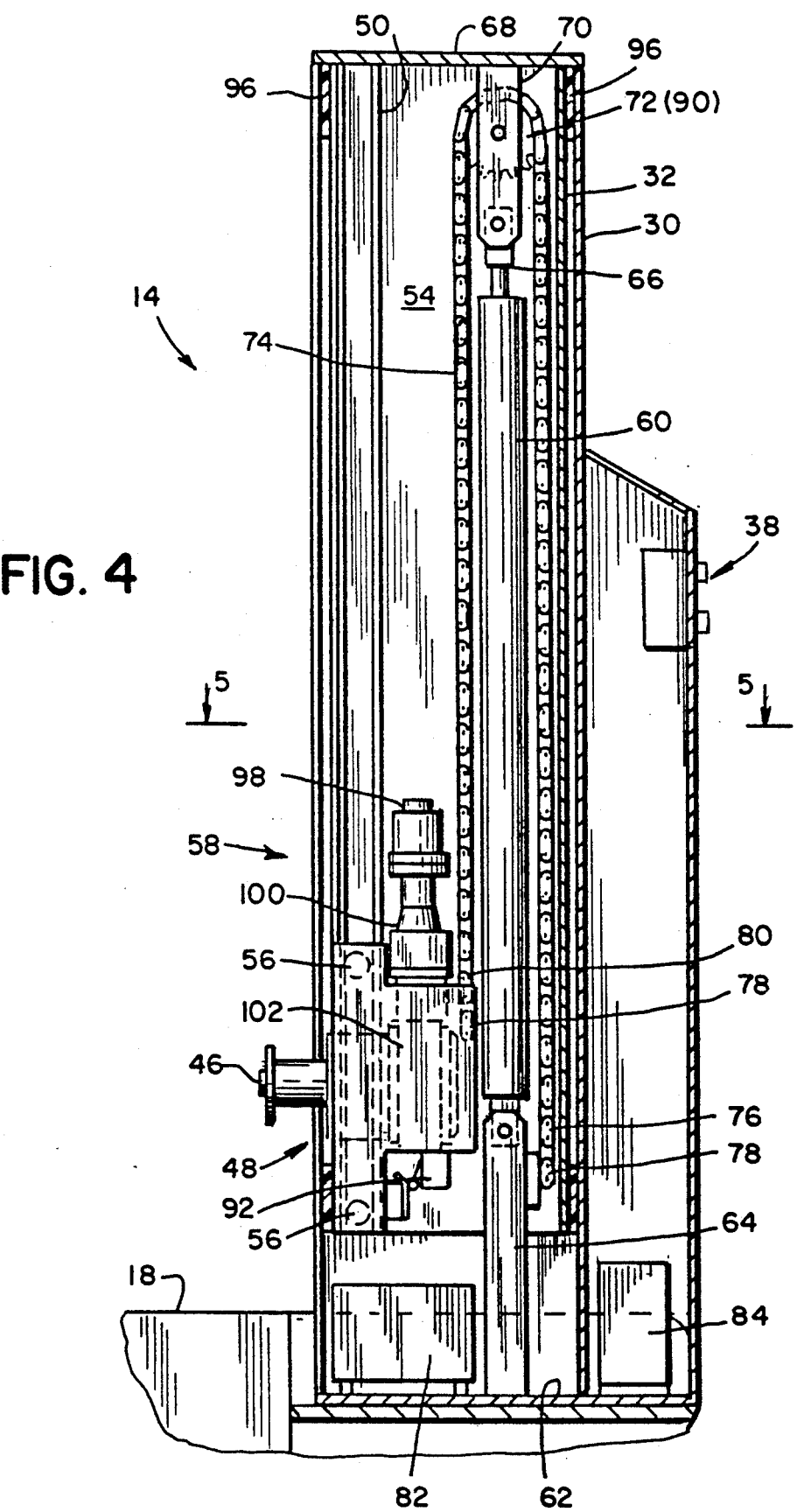
FIG. 4 represents a sectional view of the column portion of the apparatus of the present invention, This view is in an enlarged scale and showing the components interior of the column.
Figure 5:
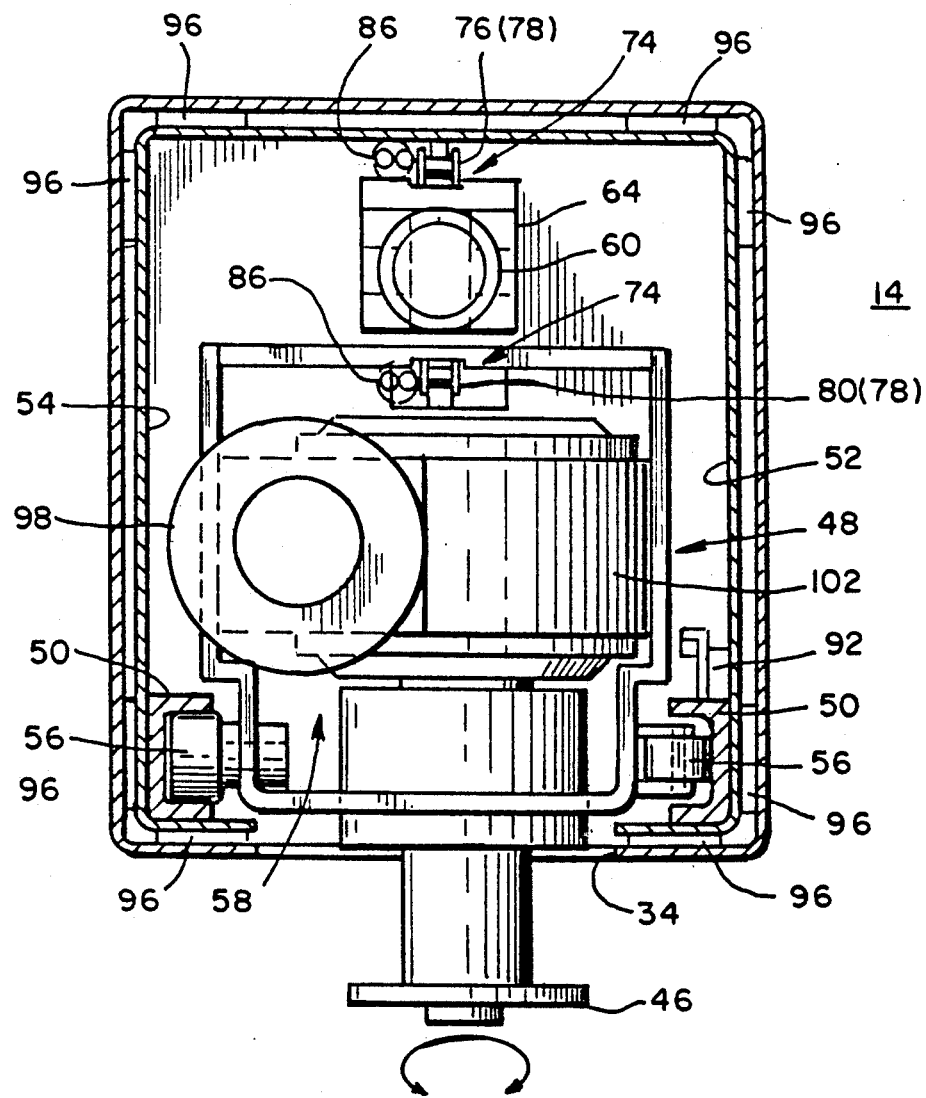
FIG. 5 represents a cross sectional view of the column, this view being taken along line 5—5 of FIG. 4.

Referring now to FIG. 4 and 5, the shaft 46 is rotatably carried on a carriage member 48 which is moveably mounted within the second tubular column 32. This carriage member 48 is guided by way of U-shaped channel members 50, These channel members 50 are mounted to opposing interior walls 52 and 54 of the second tubular column 32. The channel members 50 extend substantially the full length of the walls 52 and 54. The carriage member 48 has a plurality of guide rollers 56 which guide its movement in at least two directions.

The shaft 46 is connected to a gear-motor assembly 58 which provides rotary output. This rotary output is selectively reversible. The gear-motor assembly preferably rotates the shaft 46 at a rate between 0.5 and 5 RPM. It has been found that a rate of 1 RPM gives satisfactory results when discharging materials from a receptacle. The gear-motor 58 is driven by a pressurized fluid such as compressed air or hydraulics. The apparatus of the present invention is controlled and actuated by pressurized fluids only.

The lifting of the second tubular column 32 is provided by the extending action of a linear actuator 60. This linear actuator 60 preferably is hydraulically actuated. A hydraulic cylinder is preferred due to its lift capacity/size characteristics along with improved linear control. If and when the lifting forces permit, a pneumatically operated linear actuator 60 may be used.

Referring now to FIG. 4, the linear actuator 60 is pivotally attached to a base plate 62 of the first tubular column 30. This attachment is made by way of an elongated clevis type bracket 64. The piston rod end 66 of the linear actuator 60 is pivotally attached to a top plate 68 of the second tubular column 32 by way of a clevis type support 70. This clevis type support 70 also carries a change of direction wheel member 72 such as a sprocket, or sheave. The wheel member 72 is rotatably mounted to the support 70.

A flexible tension means 74 is attached at one end 76 to the first tubular column 30 by way of a clamp member 78. Similarly a second end 80 of the flexible tension means 74 is attached to the moveable carriage member 48 by a second of clamps 78.

Referring still to FIG. 4, a reservoir tank 82 and pump 84 are mounted to the base plate 62. The tank 82 is used to hold a supply of fluid such as hydraulic oil and the pump 84 supplies the fluid under pressure to the various operating components of the apparatus. The pump is preferably of the pneumatically operated type, meaning that compressed air operates the pump to provide the pressurized fluid.

The gear-motor 58 is preferably of the pneumatic type. The compressed air is supplied to the gear-motor by way of a flexible conductor 86 which is routed with the flexible tension means 74, as may be seen in FIG. 5. This routing along the path of the flexible tension means 74 allows the flexible conductor 86, in the form of tubing, hose or the like to be of a substantially fixed length without restricting the movement of the carriage member 48. A pulley 90 is provided in substantial alignment with the change of direction wheel 72 to maintain the desired routing without kinking of the conduit 86.

Referring again to FIG. 1, FIG. 2, and FIG. 3, one of the handles 36 is adapted to attach to a source of compressed air by way of a fitting 88. The handle 36 and fitting 88 allow the compressed air to be introduced interior of the apparatus to operate the pump 84, and the gear-motor 58.

USE AND OPERATION

The lifting and tilting apparatus 10 of the present invention is also used for transporting of a receptacle 94, placed thereon. The receptacle 94 is shown in dashed outline in FIG. 3. The wheels 20 and casters 22 allow the apparatus 10 to be moved from one loading location to a remote discharging location.

Typically the pathway between the various locations have partitions or walls, with openings provided therein. The apparatus 10 provides a compact unit capable of being moved through these openings. The typical apparatus 10 is compact in sized, being approximately 81.3 cm. (32 in.) in width, 146 cm. (57.5 in.) in length, and 171.5 cm. (67.5 in.) in height. These preceding listed dimensions apply when the column assembly 14 is in its retracted condition and the container support assembly 16 places the receptacle in an upright position, as shown in FIG. 1 and 2. When the apparatus 10, of the given dimensions, is brought to a location whereat the contents of the receptacle are to be discharged, the receiving apparatus may have an open horizontal mouth at a height of 182. cm. (72 in.).

Referring again to FIG. 1 and 2, a receptacle 94 is placed on the retracted and upright apparatus 10 and properly positioned and cradled in the container support assembly 16. The receptacle 94 is retained in its placed position by and with a clamp means, not shown. The lowered and upright apparatus 10, with receptacle 94 place thereon is manually transported to a remote discharging location. The apparatus 10 has a pair of handles 36 to provide manual steering means in cooperation with the wheels 20 and casters 22. At the remote discharge location, the operator locates the apparatus 10 relative to the receiving apparatus. The stabilizing locks 24 are lowered to act as braking means as well as a stabilizing means. The apparatus 10 is connected to a supply of compressed air by way of fitting 88. The introduction of pressurized air (90 psig) activates the air operated hydraulic pump 84. After a short interval the hydraulic pump 84 provides hydraulic oil at approximately 2500 PSIG. When the correct hydraulic pressure is reached the operator raises the column to a desired height, within the telescoping range of the the column assembly 14. The container support assembly 16 is simultaneously lifted by the raising of the second column 32. The container support assembly 16 is lifted a distance which is twice the amount of column lift, due to the geometrical path of the flexible tension means 74. The operator may tilt the container support assembly 16 to a discharge position as shown in FIG. 3 by actuating the gear-motor 58. This discharge position rotates the container approximately 140 arc degrees from its upright position.

When the container is discharged a sufficient amount the container support assembly 16 is returned to its upright position by actuating the proper control valve of the controls 38. When clearance and conditions permit, the column assembly 14 may be lowered simultaneously with the rotation of the container support assembly 16.

The apparatus 10 is provided with at least one interlock means 94, shown in FIG. 4. This particular interlock 94 prevents rotation of the container support assembly 16 when the column assembly to is in its lowered position, to avoid damage to the apparatus 10. Similarly other interlocks are positioned in the apparatus to monitor conditions such as each limiting extent of rotation, as well as the full extent of the column assembly 14.

After the container 94 has been discharged and lowered to is transport position, the apparatus may be disconnected from the compressed air supply and the stabilizing locks 24 retracted for transporting.

Referring to FIG. 5, the guide rollers 56 on the left side of the column provide a bending guidance for the moveable carriage member 48. Whereas the guide roller 56 located on the right side of the column 32 provide torsional guidance for the moveable carriage member 48. These guide rollers 56 preferably are standard cam follower bearings secured to the carriage member 48.

As previously noted the apparatus is operated only by a pressurized fluid or a combination of pressurized fluids. The preferred arrangement is pneumatically actuated hydraulic pump 84, with its associated control valve, not shown. The balance of the system is pneumatically operated and controlled, The pilot circuit, including interlocks and operator controls 38, for each of the control valves used for controlling the linear actuator 60 and the gear-motor 58 are pneumatically operated.

The flexible conduit or conduits which carry the pneumatic signal may be carried in a protective outer sleeve member as shown in FIG. 5.

The second tubular column 32 is guided by suitable plate bearing members 96 located at each corner of the column as shown in FIG. 5. These plate bearing members are preferably of a plastic bearing type.

The gear-motor assembly 58 is preferably of a right-angle design. The right-angel design permits the axis of the input shaft to be substantially parallel to the axis of the tubular column assembly 14. The gear-motor may comprise individual units such as an air motor 98; a parallel gear reducer 100; and a right-angle gear reducer 102 which have been fastened to each other. The arrangement as shown in FIG. 4 allows the shaft 46 to be brought closer to the floor line 28 while being at a convenient balance point for the container support assembly 16.

As an example the position of the shaft 46 is approximately 45.7 cm.(18 in) from the floor in the lowered position. In the case of the previously cited overall dimensions, the shaft 46 is lifted to a height of 217.5 cm (85.625 in.) from the floor, for discharging into a receptacle opening at 182 cm. The shaft 46 has been lifted approximately 171.7 cm (67.626 in) while the second tubular column has only been lifted one-half the distance 85.9 cm. (33.82 in.).

DESCRIPTION OF THE ALTERNATE EMBODIMENT

Figure 8:
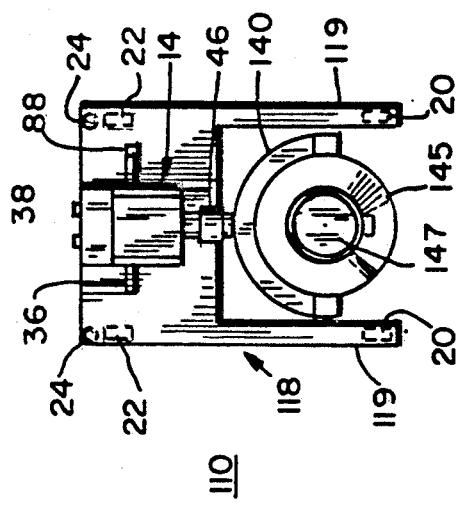
FIG. 8 represents a plan view of the alternate embodiment.
Figure 6:
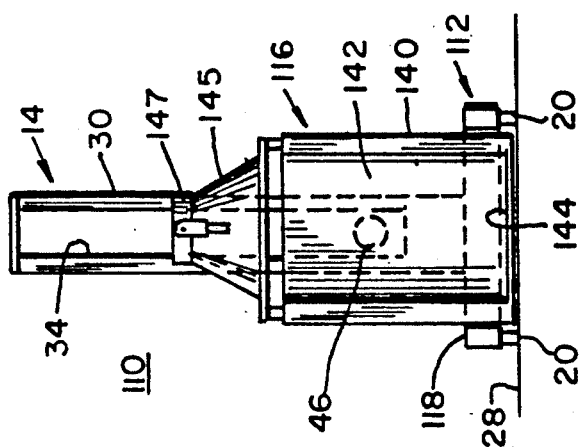
FIG. 6 represents an elevational view of an alternate embodiment of the present invention, this view particularly showing a container support assembly with a funnel attachment.
Figure 7:
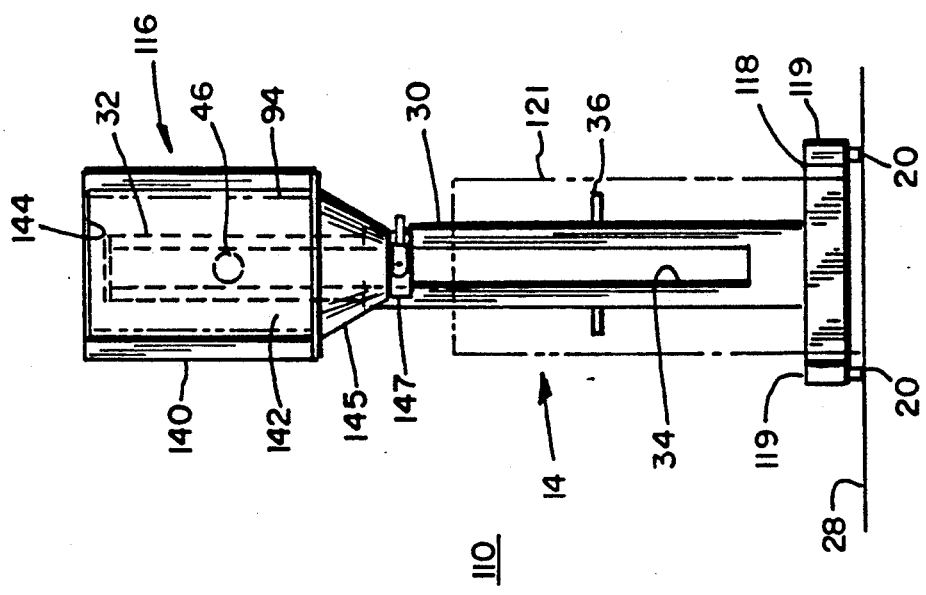
FIG. 7 represents an elevational view of the alternate embodiment showing the apparatus in a raised condition with the container support inverted.

Referring now to FIGS. 6, 7, and 8, there is shown an alternate embodiment of the apparatus of the present invention. This apparatus is generally identified as 110. This alternate embodiment 110 includes a base assembly 112, a column assembly 114 and a container support assembly 116. The column assembly 14 has substantially the same construction as the column assembly 14 described above and shown in FIG. 4 and FIG. 5.

Referring now particularly to FIG. 8, the base support assembly 112 has a shaped base support 118, which is shaped and contoured to allow drums 94 of flowable material to be placed onto the container support assembly 116 from the front of the apparatus 110. The shaped base support 118 is shaped in a U-shape for providing a pair of extending leg members 119. These leg members 119 are sufficiently spaced and have a sufficient throat depth to allow the container support assembly 116 to be lowered substantially to the level of the floor line 28. The base support assembly 112 includes wheels 20, casters 22 and stabilizing locks 24.

Now referring to FIG. 7, this U-shaped configuration allows the apparatus 110 to straddle a receiving receptacle 121, shown in dashed outline, as and when the container support assembly 116 is brought to a lifted condition.

Referring now to FIG. 6, the container support assembly 116 is adapted for lifting and tilting by shaft 46 which extends through the slot 34 of the column assembly 14. This container support assembly 116 includes a frame 140, an elongated cradle 142, a shelf 144, and a cone shaped funnel assembly 145. The shelf 144 is in a lowered condition to allow placement of a container or drum 94 on the container support assembly 116. After placement of the container thereon, the shelf 144 may be manually or pneumatically raised to engage and retain the container 94 between the shelf 144 and the cone shaped funnel assembly 145. The funnel assembly 145 provides a substantially full covering of an open mouth of the container 94.

This funnel assembly 145 is preferably fitted with a valve means 147, such as U.S. Pat. No. 4,462,567 which issued to me on Jul. 31, 1984. Of course other suitable valve means may be used to control the discharge of the flowable material.

USE AND OPERATION

The alternate embodiment of the apparatus 110 has a similar function as apparatus 10. Apparatus 110 includes a column assembly 14 which may have its second column 32 selectively raised by an operator. This second column 32 is telescopically received in first column 30. The lifting of the shaft 46 has been discussed above in connection with first embodiment. Referring particularly to FIG. 6 a drum, container and the like 94 is placed on the container support assembly 116 from the front of the apparatus 110. The shelf 144 is raised to retain the container 94. The apparatus 110 is moved near to the discharge site. The apparatus is connected to a supply of a pressured gas such as air by way of fitting 88. The hydraulic pump 60 is activated simultaneously with the proper connection to fitting 88. When a predetermined pressure level is reached for the hydraulic fluid, the second column 32 may be raised by actuation of the appropriate control 38. As the second column 32 is raised the shaft 46 carried on a carriage assembly 48 is lifted. The lifting of the shaft 46 also lifts the container support assembly 116 connected thereto. After the container support assembly is lifted a sufficient distance from the floor line 28 to clear the receiving receptacle 121 the container support assembly is tilted substantially 180 degrees to an inverted condition, as shown in FIG. 7. The operation of the gear motor operated tilting action has been detailed in the description above associated with the first embodiment. The valve 147 is manually actuated to release the flowable material into the receiving receptacle 121.

After a desired amount of the material is discharged, the valve 147 is placed in a closed position. The apparatus 110 may be left in this raised condition until the material is fully discharged. Of course the partially emptied drum 94 may be brought to an upright condition and lowered for transport to another location. The independent lifting and tilting of the apparatus 110 allows the operator to meet various discharging requirements as to place and height.

It is to be noted the independent control of the lifting and tilting of apparatus 10 and 110 may suggest sequences of operation other than previously described.

The present invention for an apparatus for lifting and tilting disclosed and described above also suggests a method for providing such an apparatus. This apparatus provides for the independent controlled actuation of the lifting and the tilting of a container. The tilting of the container being of a sufficient angle to discharge a flowable material. This method including the steps of:

providing a base support and a first elongated tubular column, arraying an axis of said first elongated tubular column in a substantially vertical position;

providing a second elongated tubular column, configuring said second elongated tubular column to be slidably positioned within said first tubular column;

forming a slot in each of the first elongated tubular column and the second tubular column, providing access to the interior of said second tubular column by aligning each of said slots;

providing a container support assembly, adapting said container support assembly to receive and support the container;

providing a means for retaining the container in a placed condition during lifting and tilting;

providing a moveable carriage member within said second tubular column, said moveable carriage member having a plurality of guide rollers rotatably secured thereto;

attaching U-shaped channel members to opposing walls of said second tubular column;

mounting a hydraulic cylinder to a base plate interior of said first tubular column, and attaching a rod end of said hydraulic cylinder to a top portion of said second tubular column;

providing a flexible tension means interior of said second column, and attaching one end of said flexible tension means to a selected point on said first tubular column and attaching a second end of said flexible tension means to a selected point on said moveable carriage member;

mounting a reversible rotary gear-motor to said moveable carriage member and attaching an output shaft of said gear-motor to said container support;

providing a pump means to pressurizing a first fluid;

providing a flexible conductor and fluidly connecting said flexible conductor between said pump means and said hydraulic cylinder;

providing a first control means and a second control means for the independent actuation of said lifting and tilting movements;

providing a means for removably connecting said lifting and tilting apparatus to a source of a compressed gas as and when desired; and mounting a plurality of wheels and casters to said base support.

The present invention as disclosed above also suggests a method for discharging a flowable material from a drum, container and the like being placed and retained on a container support assembly of a lifting and tilting apparatus, said method including the steps of:

Activating a pump means carried on a lifting and tilting apparatus by connecting a supply of a compressed gas to a fitting carried on said lifting and tilting apparatus;

Lifting a container support assembly by manually directing a pressurized fluid generated by said pump means to a hydraulic cylinder, said applying of said pressurized fluid extending a rod end of said hydraulic cylinder to be extended to a selected point, said extending of said rod end lifting a second tubular column, said second tubular column being telescopically slideable in a first tubular column; said container support assembly being lifted twice the distance of the lifting of said second column by selectively routing a flexible tension means between said first tubular column and a moveable carriage, said moveable carriage being carried interior of said second tubular column on U-shaped guide rails, said moveable carriage assembly being connected to said container support assembly;

discharging said flowable material by tilting said container support assembly by applying said compressed gas to a gear-motor assembly independently of said lifting movement, said gear-motor being carried on said moveable carriage assembly interior the second tubular column;

bringing said container support assembly to a substantially upright position by reversing said gear-motor;

lowering said container support assembly independently of said reversing of said gear motor by controllably removing said lifting pressurized fluid from said hydraulic cylinder; and deactivating said pump means by disconnecting said lifting and tilting apparatus from said compressed gas source.

Terms such as "left", "right", "up", "down", "bottom", "top", "front", "back", "in", "out", and the like are applicable to the embodiments shown and described in conjunction with the drawings. These terms are merely for the purpose of description and do not necessarily apply to the position in which the lifting and tilting apparatus of the present invention may be utilized.

While these particular embodiments of an improved lifting and tilting apparatus and method have been shown and described, it is to be understood that the invention is not limited thereto and protection is sought to the broadest extent the prior art allows.

What is claimed is:

1. Apparatus for lifting and tilting a container of flowable material placed on the apparatus which includes:
   (a) a base support and first elongated tubular column, an axis of the first elongated tubular column being arrayed in a substantially vertical position while being secured to said base support;
   (b) a second elongated tubular column configured so as to be slidably positioned within said first tubular column;
   (c) a slot formed in each of the first elongated tubular column and the second tubular column, each slot being in substantial alignment with each other while providing an access opening to an interior of the first elongated tubular column and the second elongated tubular column;
   (d) a container support having a bottom portion adapted to receive and support a weight of said container;
   (e) means for retaining the support in a placed condition on the container support during lifting and tilting of the container;

(f) a movable carriage member positioned within the second elongated tubular column, said moveable carriage member being lifted at a selected rate as the second elongated tubular column is lifted, this moveable carriage member having guide rollers rotatably secured thereto;

(g) at least two U-shaped channel members, each of said U-shaped channel members being attached to opposing walls of the second elongated tubular column for providing guideways for each of the guide rollers secured to the moveable carriage member;

(i) a selectively actuated lift and lowering means which includes a hydraulic cylinder secured to and supported by a base plate in the first elongated tubular column and with this hydraulic cylinder having a piston rod end secured to a support carried by and fixed to a top portion of said second elongated tubular column, this hydraulic cylinder adapted to lift the second elongated tubular column;

(j) a flexible tension means for connecting the first elongated tubular column to the moveable carriage member to provide said lifting at said selected rate;

(k) a reversible rotary gear-motor secured to said moveable carriage member, said rotary gear-motor being moveable with said moveable carriage member, said rotary gear-motor being operated by a pressurized fluid, an output shaft of said rotary gear-motor providing for the tilting of the container support; said output shaft extending through each of said slots;

(l) a pump means adapted for providing a hydraulic fluid at a selected pressure to said hydraulic cylinder;

(m) a flexible conductor means for fluidically connecting and selectively carrying said pressurized fluid to said rotary gear-motor, said flexible conductor being adapted to allow full lifting of said rotary gear-motor on and with said movable carriage member; and (n) wherein said lifting of said container support is controllable by a first valve means, and said lifting of the container support is controllable by a second valve means.

2. An apparatus as recited in claim 1 wherein said rotary gear-motor includes a tight angle reducer member for allowing said gear-motor to be fully enclosed within said second tubular column.

3. An apparatus as recited in claim 1 wherein said rotary gear-motor includes a pneumatically operated motor portion.

4. An apparatus as recited in claim 3 wherein said pump means includes a pneumatically operated hydraulic pump.

5. An apparatus as recited in claim 4 which further includes a pneumatic fitting for removably connecting said apparatus to a supply of compressed air for activating said pump means, said compressed air being also employed in a selective activation of said gear-motor.

6. An apparatus as recited in claim 1 wherein said container support includes a semi-circular container cradle, said semi-circular container cradle having one end shaped as a pour spout for guiding any material carried thereon.

7. An apparatus as recited in claim 1 wherein said flexible tension means is routed around a first wheel member, said first wheel member being rotatably mounted to said support carried by and fixed to said top portion of said second tubular column, said routing of said flexible tension member providing said moveable carriage member with a selected rate of twice a rate of movement of the second tubular column.

8. An apparatus as recited in claim 7 wherein said flexible tension means includes a link chain.

9. An apparatus as recited in claim 1 which further includes a plurality of wheels and a plurality of casters mounted to the base support, said plurality of wheels and casters allowing said apparatus to be manually moved from one location to another.

10. An apparatus as recited in claim 1 wherein said first valve means and said second valve means are operated only by compressed air.

11. An apparatus as recited in claim 1 wherein said container support means includes a cone shaped funnel assembly, said cone shaped funnel assembly being further adapted for providing said retaining means.

12. An apparatus as recited in claim 11 wherein said cone shaped funnel assembly includes a discharge valve means for the selective discharge of said flowable material.

13. An apparatus as recited in claim 11 wherein said base support is substantially U-shaped, said U-shape providing for front placement of said container.

14. A method for producing a lifting and tilting apparatus, said lifting and tilting of a container by said apparatus being independently controllable, said method including the steps of:

providing a base support and a first elongated tubular column, arraying an axis of said first elongated tubular column in a substantially vertical position;

providing a second elongated tubular column, while configuring said second elongated tubular column to be slidably positioned within said first tubular column;

forming a slot in each of the first elongated tubular column and the second tubular column, providing access to an interior of said second tubular column by aligning each of said slots;

providing a container support assembly, adapting said container support assembly to receive and support the container;

providing a means for retaining the container in a placed condition during lifting and tilting;

providing a moveable carriage member within said second tubular column, said moveable carriage member having a plurality of guide rollers rotatably secured thereto;

attaching U-shaped channel members to opposing walls of said second tubular column;

mounting a hydraulic cylinder to a base plate interior of said first tubular column, and attaching a rod end of said hydraulic cylinder to a top portion of said second tubular column;

providing a flexible tension means interior of said second column, and attaching one end of said flexible tension means to a selected point on said first tubular column and attaching a second end of said flexible tension means to a selected point on said moveable carriage member;

mounting a reversible rotary gear-motor to said moveable carriage member and attaching an output shaft of said gear-motor to said container support;

providing a pump means for pressurizing a hydraulic fluid;

providing a flexible conductor and fluidly connecting said flexible conductor to selectively carry a compressed gas to said rotary gear-motor;

providing a first control means and a second control means for independent actuation of said lifting and tilting movements;

providing a means for removably connecting said lifting and tilting apparatus to a source of said compressed gas as and when desired; and mounting a plurality of wheels and casters to said base support.

15. A method as recited in claim 14 which includes the further step of providing a cone shaped funnel assembly on one end of said container support assembly to provide said retaining means.

16. An apparatus as recited in claim 15 which includes the further step of providing a discharge valve means in said cone shaped funnel assembly to provide a closure means.

17. A method for discharging a flowable material from a container being placed and retained on a container support assembly of a lifting and tilting apparatus, said method including the steps of:

activating a pump means carried on a lifting and tilting apparatus by connecting a supply of a compressed gas to a fitting carried on said lifting and tilting apparatus;

lifting a container support assembly by manually directing a pressurized fluid generated by said pump means to a hydraulic cylinder, said directing of said pressurized fluid extending a rod end of said hydraulic cylinder to be extended to a selected point, said extending of said rod end lifting a second tubular column, said second tubular column being telescopically slideable in a first tubular column; said container support assembly being lifted twice a distance of the lifting of said second column by selectively routing a flexible tension means between said first tubular column and a moveable carriage, said moveable carriage being carried interior of said second tubular column on U-shaped guide rails, said moveable carriage assembly being connected to said container support assembly;

discharging said flowable material by tilting said container support assembly by directing said compressed gas to a gear-motor assembly independently of said lifting movement, said gear-motor being carried on said moveable carriage assembly interior the second tubular column;

bringing said container support assembly to a substantially upright position by reversing said directing of said compressed gas to said gear-motor;

lowering said container support assembly independently of said reversing of said gear motor by controllably removing said lifting pressurized fluid from said hydraulic cylinder; and deactivating said pump means by disconnecting said lifting and tilting apparatus from said compressed gas source.

18. A method as recited in claim 17 wherein said step of discharging said flowable material includes the further steps of:

inverting said container support assembly for said discharging; and opening a discharge valve by manual operation.

19. A method as recited in claim 17 wherein said retaining of the container further includes the step of raising a shelf portion of said container support assembly.

* * * * *